US010263939B1

(12) United States Patent
Mierau et al.

(10) Patent No.: US 10,263,939 B1
(45) Date of Patent: Apr. 16, 2019

(54) REQUESTING ADDITIONAL CONTENT BASED ON TRIGGERS

(71) Applicant: Path Mobile Inc Pte. Ltd., Singapore (SG)

(72) Inventors: Dustin R. Mierau, San Francisco, CA (US); David B. Morin, San Francisco, CA (US)

(73) Assignee: PATH MOBILE INC PTE. LTD., Singapore (SG)

(*) Notice: Subject to any disclaimer, the term of this patent is extended or adjusted under 35 U.S.C. 154(b) by 629 days.

(21) Appl. No.: 13/951,350

(22) Filed: Jul. 25, 2013

Related U.S. Application Data

(60) Provisional application No. 61/675,430, filed on Jul. 25, 2012.

(51) Int. Cl.
*G06F 15/16* (2006.01)
*H04L 12/58* (2006.01)

(52) U.S. Cl.
CPC .................. *H04L 51/32* (2013.01)

(58) Field of Classification Search
CPC .. H04L 65/403; H04L 67/306; H04L 12/1822
USPC ......................................................... 709/204
See application file for complete search history.

(56) References Cited

U.S. PATENT DOCUMENTS

| 8,560,962 | B2* | 10/2013 | Wang | G06Q 30/0224 715/751 |
| 8,686,852 | B2* | 4/2014 | Ben-Dayan | G08B 21/0261 340/539.13 |
| 8,694,920 | B2* | 4/2014 | Kirtane | G06F 9/451 715/846 |
| 8,930,452 | B2* | 1/2015 | Baalu | G06Q 30/02 709/204 |
| 2005/0160167 | A1* | 7/2005 | Cheng | G06Q 10/06 709/224 |
| 2012/0054292 | A1* | 3/2012 | Weda | G06Q 10/10 709/206 |
| 2012/0102114 | A1* | 4/2012 | Dunn | G06Q 10/10 709/204 |
| 2012/0124479 | A1* | 5/2012 | Morin | G06F 17/30905 715/741 |
| 2013/0073400 | A1* | 3/2013 | Heath | G06Q 30/02 705/14.73 |
| 2013/0253833 | A1* | 9/2013 | Tuukkanen | G01C 21/26 701/538 |
| 2014/0040344 | A1* | 2/2014 | Gehring | G06F 9/542 709/203 |
| 2014/0129942 | A1* | 5/2014 | Rathod | H04N 21/44222 715/720 |

* cited by examiner

*Primary Examiner* — Kevin T Bates
*Assistant Examiner* — Emad Siddiqi
(74) *Attorney, Agent, or Firm* — Cantor Colburn LLP

(57) ABSTRACT

A social networking system receives information regarding an activity performed by a user of the social networking system. A determination is made as to whether an activity trigger is satisfied based on the received information. Responsive to a determination that the trigger is satisfied, additional content regarding the activity is requested from the user.

18 Claims, 9 Drawing Sheets

REQUESTING ADDITIONAL CONTENT BASED ON TRIGGERS

CROSS REFERENCE TO RELATED APPLICATION

This application claims the benefit of U.S. Provisional Application No. 61/675,430, titled "Requesting Additional Content Based on Triggers" filed on Jul. 25, 2012, which is incorporated by reference in its entirety.

BACKGROUND

1. Field of Art

The described embodiments generally relate to social networking, and in particular to encouraging users to share social networking content.

2. Description of the Related Art

Social networking systems have grown rapidly in recent years. Such systems enable users to establish various connections with other users (also referred to as "friends"). Users are also able to share content with their friends through social networking systems. For example, if a user of a social networking system is currently on vacation, the user can keep friends updated on his vacation through the social networking system. As a general matter, user experiences over social networking systems are enhanced as users generate more content. Current social networking systems, however, are unable to effectively encourage their users to share additional content over the systems.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Configuration Overview

One embodiment of a disclosed system, method and computer readable storage medium facilitates the requesting of additional content from a particular user of a social networking system based on one or more triggers.

In one embodiment, information regarding an activity of a user of a social networking system is received. A determination is made as to whether an activity trigger (e.g., an activity condition) is met/satisfied based on the received information. For example, a determination is made as to whether the user is currently traveling based on the information. Responsive to a determination that the trigger is met, additional content regarding the activity is requested from the user. In one implementation, the request is automatically provided to the user. In another implementation, the request is provided to the user only if other users connected to the user (e.g., friends) request the additional content. In particular, a request mechanism may be provided to the one or more other users connected to the user over the social networking system, where the request mechanism enables the one or more other users to request additional content related to the activity from the user (i.e., a request option is provided that enables the others users to request additional content).

In another embodiment, a request for additional content is provided to a user based on a determination as to whether an inactivity trigger is met. More specifically, a determination is made as to whether the user has been inactive (e.g., has not uploaded content or otherwise interacted with the social networking system) in excess of a predefined period of time. Responsive to a determination that the user has been inactive in excess of the predefined period of time, a request mechanism is provided to one or more other users connected to the user over the social networking system. The request mechanism enables the one or more other users to request additional content from the user.

Computing Machine Architecture

Figure 1:
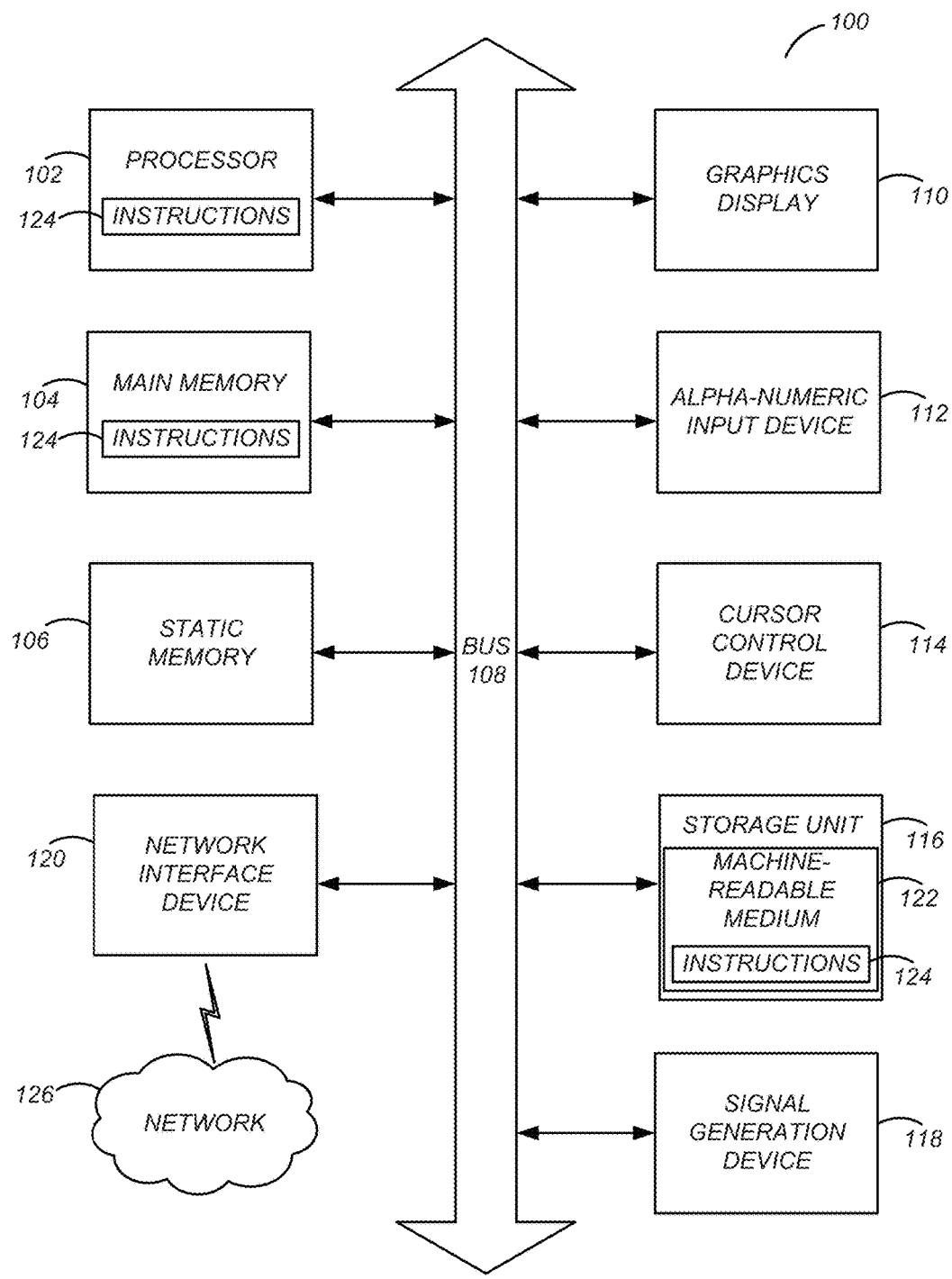
FIG. 1 illustrates one embodiment of components of an example machine able to read instructions from a machine-readable medium and execute them in a processor (or controller), according to an embodiment.

FIG. (Figure) 1 is a block diagram illustrating components of an example machine able to read instructions from a machine-readable medium and execute them in a processor (or controller). One or more of the example machines may be used as parts of user devices 202 and/or a social networking system 201, which are further described below with reference to FIG. 2. FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Architecture

Figure 2:
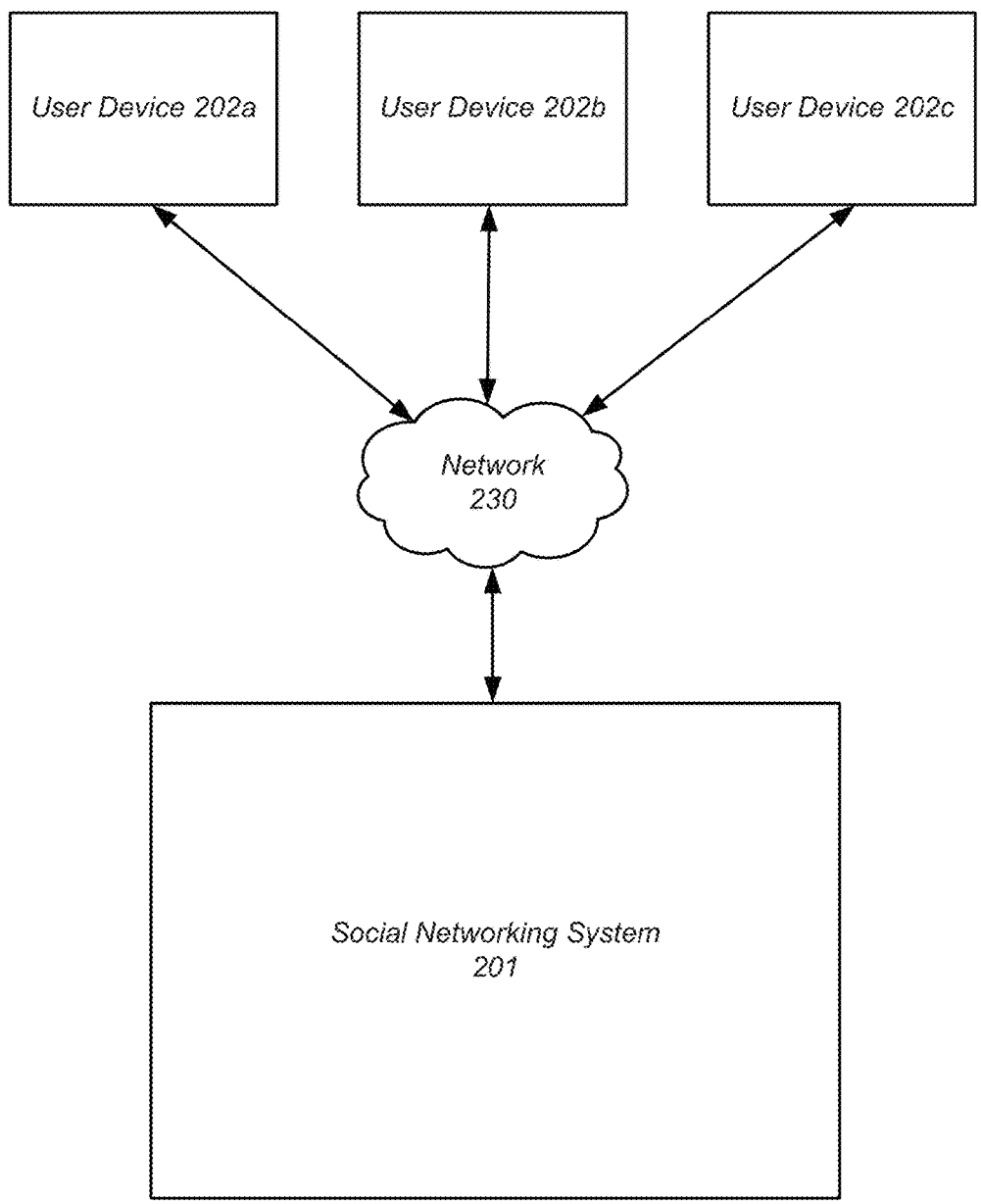
FIG. 2 is a high-level block diagram illustrating an embodiment of a system environment suitable for operation of a social networking system, according to an embodiment.

FIG. 2 is a high-level diagram illustrating a typical environment 200 used for requesting additional content based on triggers according to one embodiment. As shown in FIG. 2, the environment 200 includes a social networking system 201, user devices 202, and a network 230. Each of the user devices 202 and the social networking system 201 may be in communication with one another via the network 230. Only one social networking system 201 and three user devices 202 are shown in FIG. 2 for purposes of clarity, but those of skill in the art will recognize that typical environments can have thousands or millions of user devices 202, and can also have multiple social networking systems 201.

The network 230 enables communications between the various entities of the environment 200. In one embodiment, the network 230 uses standard communications technologies and/or protocols. Thus, the network 230 can include links using technologies such as Ethernet, Wireless Fidelity (WiFi) (e.g., 802.11), worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 230 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 230 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 230 can also include links to other networks such as the Internet.

The user devices 202 are computing devices operable by one or more users of the social networking system 201. In one embodiment, the user devices 202 may be one or more of a laptop computer, desktop computer, personal digital assistant (PDA), tablet device, smartphone, gaming device, and/or the like. The user devices 202 may additionally be configured to execute a suitable software applications such as the PATH application developed by Path, Inc. In one aspect, the users of the user devices 202 may each have a user profile associated with the social networking system 201. The user profiles may include, for example, information about the users (e.g., age, gender, interests), content associated with the users (e.g., pictures and/or other images), etc. The users of the user devices 202 may additionally establish social network connections with other users of the social networking system 201. For example, a user may become a friend or follower of another user of the social networking system 201.

The social networking system 201 stores a social network comprising the users of the user devices 202. In particular, the social networking system 201 maintains the set of established connections between the users of the user devices 202. For example, the social networking system 201 may maintain a set of connections for a user indicating other users of the social networking system 201 with whom the user is friends. The social networking system 201 additionally enables its users to communicate with one another via their user devices 202. In particular, the social networking system 201 enables those users that have established social network connections with one another to communicate. In this way, the social networking system 201 enables users to control their communication to only a certain group users (i.e., to a closed and personal social network). The social networking system 201 may further store the user profiles of the users.

In some embodiments, the social network stored by the social networking system 201 may be bidirectional. In particular, users that are connected may automatically access each other's content. In other embodiments, the stored social network may be unidirectional. In particular, the social networking system 201 may support connections where a user may access the content of another user, but not vice versa.

In one embodiment, the social networking system 201 maintains one or more discrete moments for its users. An individual moment may refer to a content item related to an activity of a user, where other users of the social networking system 201 are permitted to interact with the content item. As an example, the social networking system 201 may maintain a moment indicating that a particular user is currently in Hawaii. The moment may be presented to other users of the social networking system 201 with which the particular user is connected and who are authorized to receive moments of the particular user. The other users may comment on, express an emotion regarding, and/or otherwise interact with the presented moment.

In one embodiment, each generated moment has a particular moment type. For example, a moment may have a travel type, a multimedia type, a connection type, etc. Illustratively, a moment indicating that a user is visiting a particular city may have a travel type. In contrast, a moment indicating that a user is currently listening to a particular song may have a multimedia type. As yet another contrasting example, a moment indicating that a user has established a friendship with another user may have a connection type.

In some instances, a moment may be generated responsive to an explicit indication from a user. For example, a particular user may interact with a user interface associated with the social networking system 201 in order to have a moment generated and/or presented to other users. In other instances, a moment may be automatically generated based on information associated with a user. Illustratively, the social networking system 201 may automatically and periodically receive location information (e.g., global satellite positioning (GPS) data) from a user device 202 of a particular user of the social networking system 201. Upon receiving the location information, the social networking system 201 may automatically generate a moment for the user based on the location information. Such a moment may thereafter be automatically presented to those other users connected to the user and authorized to receive moments by the particular user. As used herein, such an automatically generated moment may be referred to as an ambient moment.

In one embodiment, the social networking system 201 facilitates the request of additional content from a particular user regarding a moment. In one embodiment, when a moment is generated for a user, the social networking system 201 determines whether the generated moment meets a predefined trigger (i.e., whether the moment satisfies the conditions of a predefined trigger). The trigger specifies the types of moments for which additional content may be requested. For example, a trigger may specify that a request for additional moment content may be initiated if the moment is of a travel type.

In order to determine whether the moment meets the trigger, the social networking system 201 determines the type of the moment. The determination of the type may be performed by making suitable inferences about the moment. In one embodiment, the type of the moment may be determined based on one or more of the following: the content of the moment, the source of information used to generate the moment, the geographic location of the user when generating the moment, and instructions provided by the user when generating the moment.

In one embodiment, to determine whether the moment is of a travel type, the social networking system 201 determines the geographic location of the particular user's residence. Such a determination may be made based on information included in the user's profile, or any other information available over the social networking system 201. For example, the particular user's profile may indicate that the user lives in San Francisco, Calif. The social networking system 201 also determines a location associated with the moment (e.g., a location of the user when the moment was created or a location included in the moment). If the location associated with the moment is more than a threshold distance from the user's residence (e.g., more than 300 miles away), the social networking system 201 determines that the moment is of a travel type.

Based on the moment type, the social networking system 201 determines whether the moment meets a trigger for requesting additional content. For example, a trigger may specify that additional content can be requested for travel type moments. As such, the social networking system 201 determines that the trigger is met if the determined moment has a travel type. If the trigger is met, the social networking system 201 facilitates the requesting of additional content from the particular user for the moment.

In one embodiment, if the trigger is met, the social networking system 201 automatically transmits a request to the device 202 of the particular user for additional content. In another embodiment, the social networking system 201 allows users connected to the particular user to be able to request additional content for the moment. More specifically, the social networking system 201 provides the moment to the social networking connections (e.g., friends) of the user. In providing the moment, the social networking system 201 provides a mechanism through which a connected user can request additional content for the moment. If a connected user requests additional content for the moment, the social networking system 201 requests the additional content from the user for whom the moment was created.

In one embodiment, if the trigger is met, the social networking system 201 automatically requests additional content from the user and also allows connected users to be able to request additional content. For example, the social networking system 201 may automatically request a specific type of additional content (e.g., a picture) and a connected user can request a different type of additional content (e.g., a current location).

In one embodiment, even if the trigger is not met, the social networking system 201 still provides the moment to the social networking connections of the user. However, the social networking system 201 does not provide the mechanism through which a connected user can request additional content for the moment.

Figure 3:
FIG. 3 illustrates an exemplary user interface including a request for additional content, according to an embodiment.

FIG. 3 illustrates an exemplary user interface 300 associated with the social networking system 201 that includes an automatically generated request for additional content for a moment 302. The user interface 300 is presented on a user device 202 to a user for whom the moment 302 was created. As shown in FIG. 3, the user interface 300 includes the moment 302 which indicates that the user has just arrived in Chicago. The moment 302 further indicates the time at which the user arrived and the temperature in Chicago. According to this example, the social networking system 201 determines that because the user does not live in the city of Chicago, the moment 302 is of a travel type. As a result, the social networking system 201 causes a request interface element 304 to be presented to the user in the interface 300. The request interface element 304 indicates to the user that additional content is being requested for the moment 302

(i.e., additional information is being requested regarding the user's travel to the city of Chicago). Additionally, through the element 304 the user may provide additional content for the moment 302.

Figure 4:
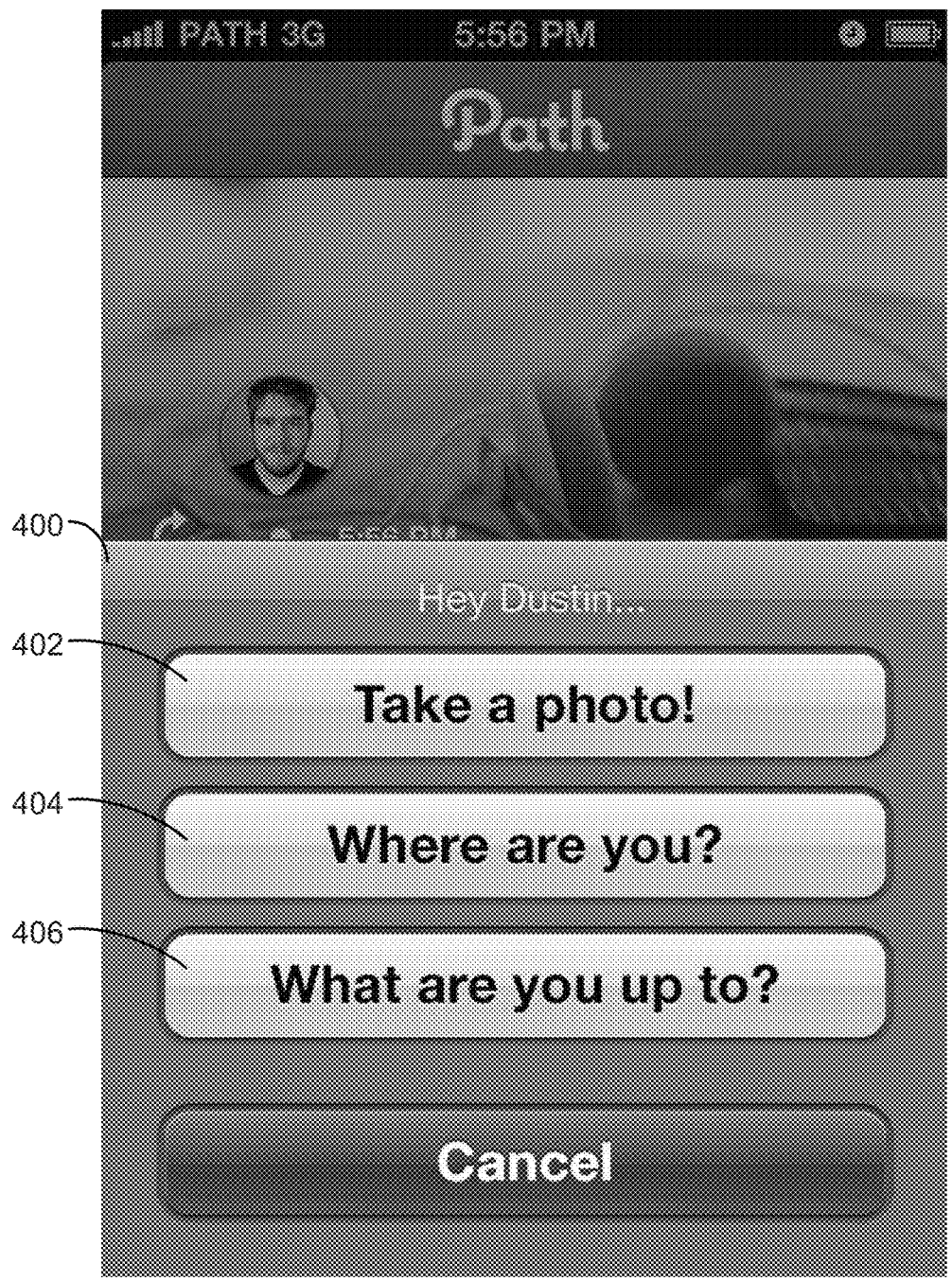
FIG. 4 illustrates an exemplary user interface including a list of questions for requesting various types of additional content from a user, according to an embodiment.

As shown in FIG. 4, if the user selects the request interface element 304, a user interface 400 is presented to the user that includes different types of requests 402, 404, and 406 for additional content. Request 402 is requesting that the user take a photo related to the moment 302 (e.g., photo related to arriving in Chicago). Request 404 is requesting that the user indicate a specific location of the user with respect to the moment 302 (e.g., current location within Chicago). Request 406 is requesting that the user indicate one or more activities the user is engaged in with respect to the moment 302 (e.g., what the user is currently doing in Chicago). In one embodiment, the user interface 400 may also include an option to comment on the moment 302.

If a user selects a request 402, 404, or 406, an interface is presented to the user through which the user can provide the additional content requested by the selected request. For example, if the user selects request 402, a camera interface may be presented through which the user can take a photo. As another example, if the user selects request 404, a map interface may be presented through which the user can indicate his current location. As yet another example, if the user selects request 406, a text box interface may be presented through which the user can provide comments regarding the user's current activities. The additional content provided by the user the user is provided to the social networking system 201 for sharing with the user's social networking connections. The social networking system 201 associates the additional content with the moment 302. In one embodiment, after the additional content is associated with the moment 302, if the moment 302 is presented to a user (e.g., to a social networking connection), the additional content is also presented or is at least accessible by the user.

Figure 5:
FIG. 5 illustrates an exemplary user interface including a set of requests for additional content associated with a moment, according to an embodiment.

As discussed, some embodiments may allow other users connected to a particular user to request additional content for a moment. In one embodiment, the requests for additional content from the other users may be grouped with the moment. For example, FIG. 5 illustrates a user interface 500 presented to a user on a user device 202. The interface includes a moment 502 generated for the user. Similar to FIG. 3, the moment 502 indicates that the user has recently arrived in Chicago (a travel type moment).

Grouped with the moment 502 are requests 504 for additional content from various friends of the user. In particular, the user has received three separate requests 506, 508, and 510 for additional content about the moment 502. Each request 506, 508, and 510 includes a picture of the friend that initiated the request along with an overlaid icon indicative of the specific additional content requested by the friend. For example, the request 506 includes an icon indicating that user take one or more photos for the moment 502 (e.g., photos of his trip to Chicago). Request 508 includes an icon indicating that the user provide information on activities the user is engaged in with respect to the moment 502 (e.g., what the user is doing in Chicago). Request 510 includes an icon indicating that that the user provide a geographic location of the user with respect to the moment 502 (e.g., current location within Chicago). If the user selects one of the requests 506, 508, or 510, an interface is presented to the user through which the user can provide the additional content of the selected request.

In additional to facilitating the requesting of additional content related to moments, the social networking system 201 may also enable users to request additional content based on triggers associated with user inactivity. More specifically, the social networking system 201 periodically determines whether certain users have been inactive longer than a threshold period of time specified by a trigger. In one embodiment, the social networking system 201 determines that a user has been inactive for longer than a threshold period if one or more of the following occurs: the user has not provided (e.g., uploaded) content to the system 201 within the threshold period, has not accessed the social networking system 201 within the threshold period, has not established new connections over the social networking system 201 within the threshold period, and has not communicated with friends over the social networking system 201 within the threshold period. If the user has been inactive for longer than the threshold period of time, the social networking system 201 provides a mechanism that enables those other users connected to the user to request additional content from the user.

Figure 6:
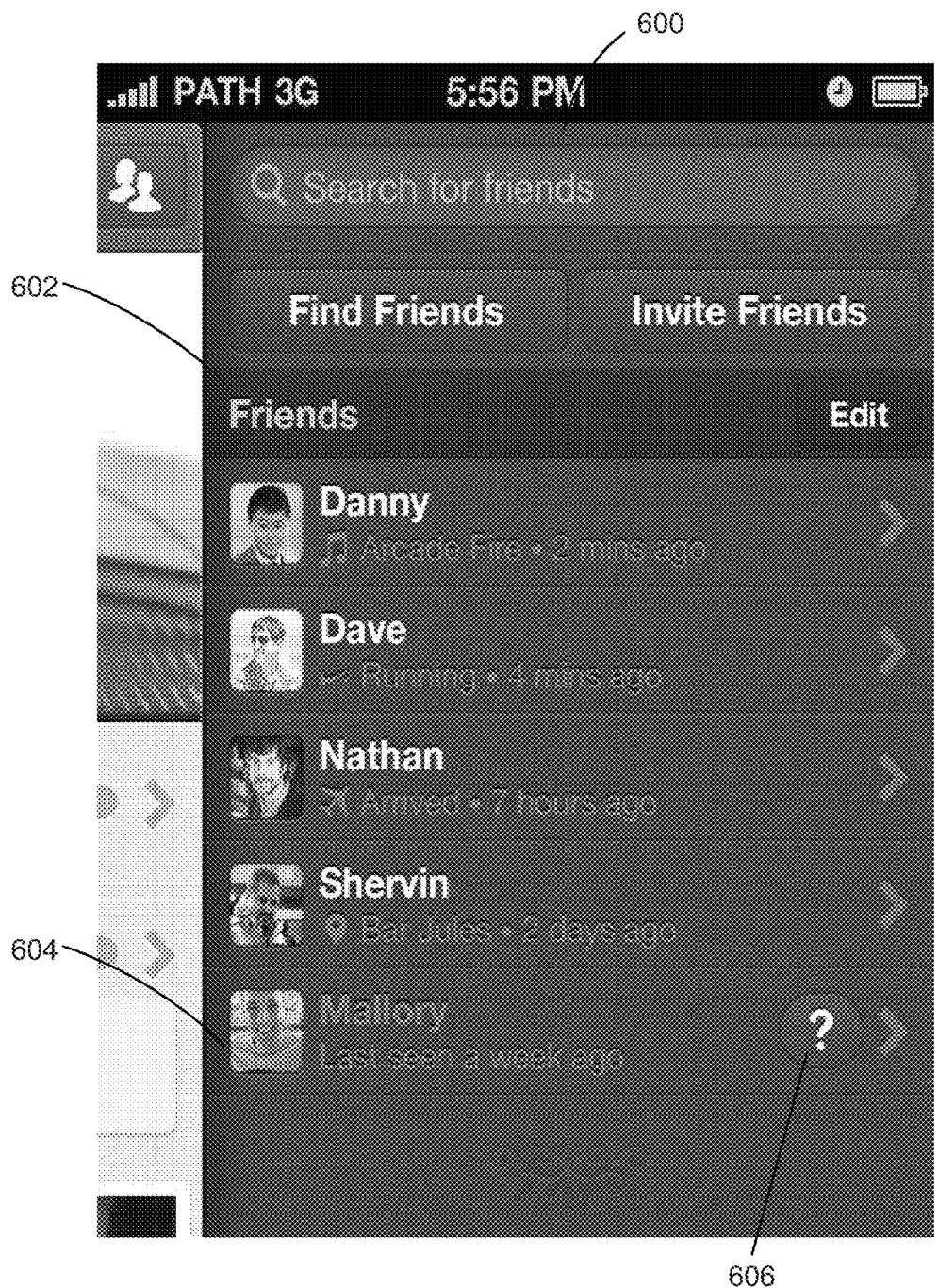
FIG. 6 illustrates an exemplary user interface including a mechanism for requesting additional content, according to another embodiment.

FIG. 6 illustrates an exemplary user interface 600 presented to a user on user device 202. The user interface 600 includes a friends list 602 with users that are connected to the user in the social networking system 201. As shown in the friends list 602, user 604 has been inactive for the last week, which in this example is longer than a threshold period of time. As a result, the social networking system 201 presents an interface element 606 (e.g., a mechanism) through which the user may request that the inactive user 604 provide additional content. Similar to FIG. 4, the user may request that the inactive user 604 provide a photo, a location of the inactive user 604, indicate an activity that the inactive user 604 is engaged in, as well as other types of content. When the user requests that the inactive user 604 provide additional content, the social networking system 201 receives the request and forwards the request to the inactive user 604.

Figure 7:
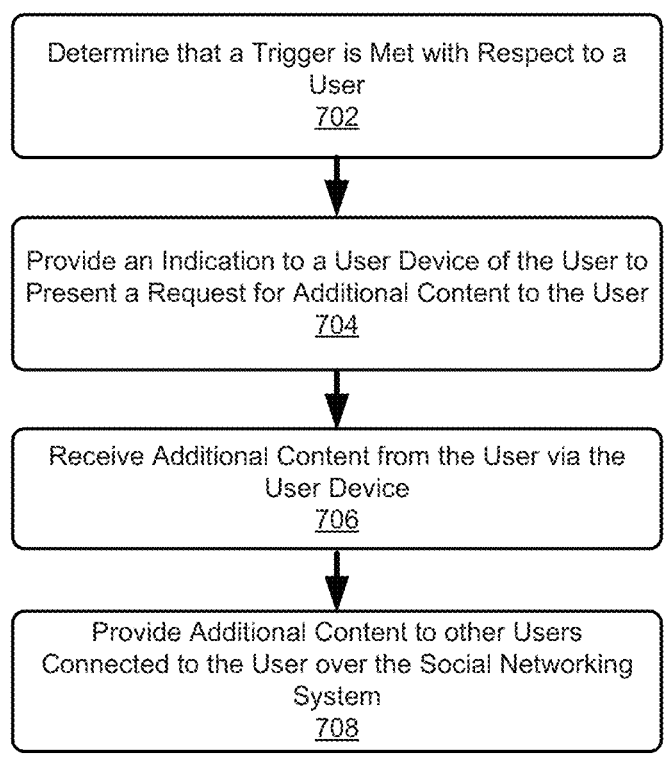
FIG. 7 is a flow chart illustrating a method for requesting additional content from a user, according to an embodiment.

FIG. 7 is a flow chart illustrating a method for requesting additional content from a user. Other embodiments can perform the steps of the method in different orders, and can include different, additional, and/or fewer steps. The method shown in FIG. 7 may be performed by any suitable entity or entities, such as the social networking system 201.

In particular, the social networking system 201 determines 702 that a trigger is met with respect to a user of the social networking system 201. For example, the social networking system 201 may determine that an inactivity trigger has been met with respect to the user because the user has not posted content to the social networking system 201 for at least a threshold period of time. As another example, the social networking system 201 may determine that a travel trigger has been met with respect to the user because a determination has been made that the user has traveled to a particular geographical location.

Following the determination, the social networking system 201 provides 704 an indication to the user device 202 of the user to present one or more requests for additional content to the user. In one embodiment, the social networking system 201 automatically provides the indication after performing the determination step 702. In other embodiments, the social networking system 201 first provides indications to the user devices 202 of other users connected to (e.g., having a friendship type relationship with) the user over the social networking system 201. The indications may instruct the user devices 202 to present request mechanisms to the other users through which the other users may generate requests for additional content from the user. Such requests may be received by the social networking system

201, and provided to the user device 202 of the user as part of the aforementioned step 704. After providing the one or more requests for additional content, the social networking system 201 may thereafter receive 706 the requested additional content from the user device 202. The social networking system 201 provides 708 the requested additional content to the other users over the social networking system 201.

Figure 8:
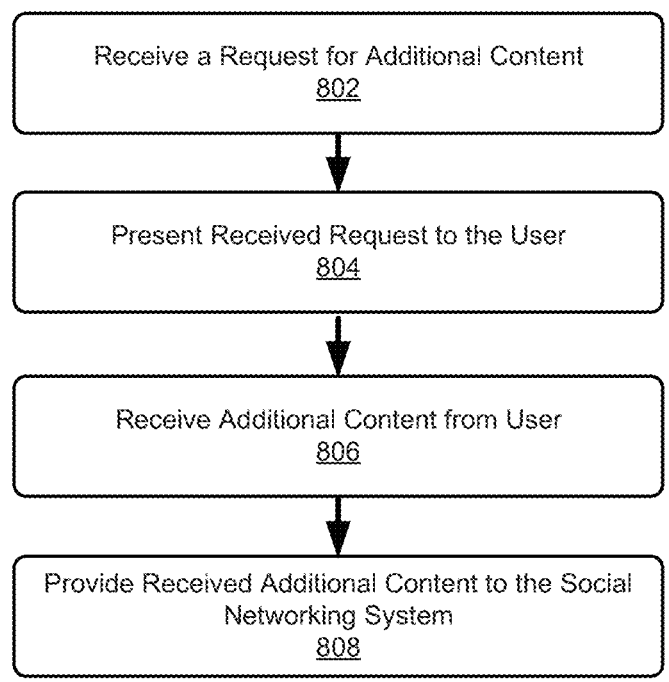
FIG. 8 is a flow chart illustrating a method for presenting requests for additional content to a user, according to an embodiment.

FIG. 8 is a flow chart illustrating a method for presenting requests for additional content to a user. Other embodiments can perform the steps of the method in different orders, and can include different, additional, and/or fewer steps. The method shown in FIG. 8 may be performed by any suitable entity or entities, such as one or more of the user devices 202.

As illustrated in FIG. 8, a user device 202 operated by the user receives 802 a request for additional content from the social networking system 201. The request may have been initiated automatically by the social networking system 201 or by other users connected to the user over the social networking system 201. After receiving the request, the user device 202 presents 804 the received request to the user. As discussed previously, FIGS. 4 and 5 show examples of the requests for additional content presented to a user. If the user device 202 receives 806 additional content from the user, the user device 202 provides 808 the received additional content to the social networking system 201 for distribution to the other users connected to the user over the social networking system 201.

Figure 9:
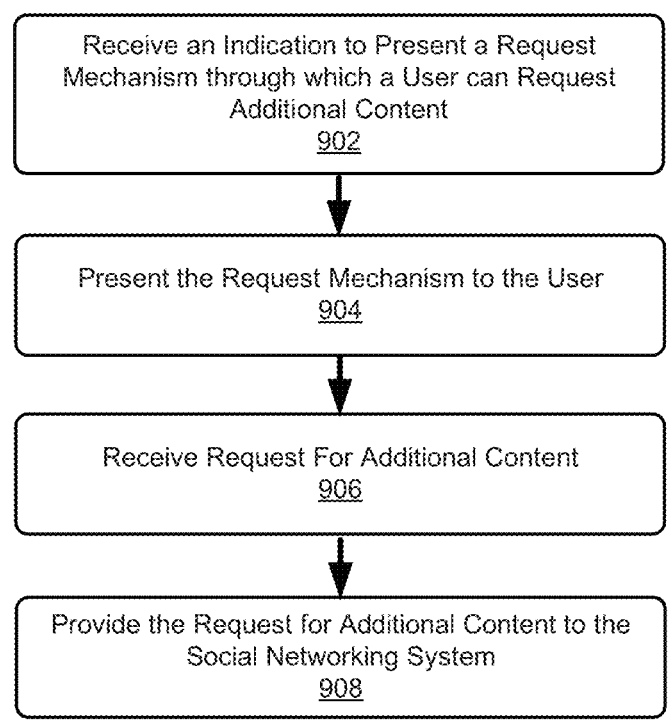
FIG. 9 is a flow chart illustrating a method for facilitating requests for additional content, according to an embodiment.

FIG. 9 is a flow chart illustrating a method for facilitating requests for additional content from a user. Other embodiments can perform the steps of the method in different orders, and can include different, additional, and/or fewer steps. The method shown in FIG. 9 may be performed by any suitable entity or entities, such as one or more of the user devices 202.

As illustrated in FIG. 9, a user device 202 receives 902 an indication to present a request mechanism to the user from the social networking system 201. The request mechanism enables the user to request additional content from another user connected to the user. The indication may have been provided by the social networking system 201 in response to a trigger being met with respect to the another user. Thereafter, the user device 202 presents 904 the request mechanism to the user. As discussed previously, FIG. 6 shows an example of the user device 202 presenting a request mechanism to a user for requesting additional content from another user. Subsequently, if the user device 202 receives 906 a request for additional content from the user, the user device 202 provides 908 the request to the social networking system 201. In one embodiment, the request may include an identifier for the another user from whom additional content is to be requested, a type of content to be requested from the user, and/or an identifier associated with the user of the user device 202.

It will be appreciated that the disclosed embodiments beneficially allow for friends and/or other connections of a particular user in a social networking system to request additional content from the user. By allowing users to encourage others to provide additional content, the amount of high quality content, communications, and user interactions over the social networking system can be expanded. As a result, the overall user experiences provided by the social networking system can be markedly improved.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Upon reading this disclosure, those of skill in the art will appreciate still additional alternative structural and functional designs for a system and a process for requesting additional content based on triggers through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   generating a moment for a first user of a social networking system based on information indicating an action performed by the first user, the moment indicating the action performed by the first user;
   determining a type of the moment based on a type of the action indicated by the moment, from among types of predetermined moments;
   determining that a predefined trigger has been satisfied based on the generated moment and the determined type of the moment;
   providing, in response to determining the trigger being satisfied, a request interface element indicating that additional content is capable of being requested for the moment of the first user, to one or more other users connected to the first user over the social networking system;
   providing, in response to the request interface element being selected by a second user of the one or more other users, request options to the second user, the request options enabling the second user to request that the first user provide additional contents to the social networking system, wherein the request options are determined based on the determined type of the moment;
   responsive to providing the request options, receiving, from the second user, a request that the first user provide additional content to the social networking system related to the action performed by the first user;
   providing the request to the first user, wherein the provided request is presented, by a user device of the first user, to the first user by generating a modified image associated with the second user base on an icon representative of the request initiated by the second user and an image associated with the second user;
   responsive to providing the request, receiving, from the first user, the additional content corresponding to the request; and
   providing, to the second user, the additional content corresponding to the request.

2. The computer-implemented method of claim 1, further comprising:
   determining that the first user has been inactive for at least a threshold period of time; and
   providing, responsive to determining that the first user has been inactive for at least the threshold period of time, an additional request option to the other users, the additional request option enabling the other users to request content from the first user.

3. The computer-implemented method of claim 2, wherein determining that the first user has been inactive for at least the threshold period of time comprises determining that a content item has not been received by the social networking system from the first user for at least the threshold period of time.

4. The computer-implemented method of claim 1, wherein the moment is generated based on determining that the first user has traveled at least a threshold distance from a location indicated in a user profile of the first user and the generated moment indicates that the first user is traveling.

5. The computer-implemented method of claim 1, wherein the additional content is at least two of: a digital image, a description of the action performed by the first user, and a current user location associated with the action performed by the first user.

6. The computer-implemented method of claim 1, wherein an additional request for additional content related to the action performed by the first user is automatically presented to the first user responsive to determining that the trigger has been satisfied.

7. The computer-implemented method of claim 1, wherein the action performed by the first user comprises at least one of:
   a first action that the first user is at a first location; and
   a second action of the first user moving to a second location.

8. The computer-implemented method of claim 7, wherein the action performed by the first user further comprises at least one of:
   a third action of the first user consuming a multimedia content;
   a fourth action of first user establishing a friendship with another user; and
   a fifth action of the first user communicating with another user.

9. The computer-implemented method of claim 1, wherein a type of the moment is determined based on at least one of a content of the moment, a source of information used to generate the moment, a geographic location of the first user when generating the moment, and an instruction provided by the first user when generating the moment.

10. The computer-implemented method of claim 1, wherein based on a type of the generated moment a determination is made that the predefined trigger has been satisfied.

11. The computer-implemented method of claim 1, wherein the providing the request comprises:
   automatically providing, to the user device for presentation to the first user, a request for additional content of a predetermined type, and
   wherein the type of the additional content corresponding to the request by the other users connected to the first user is different from the predetermined type corresponding to the request provided automatically.

12. A computer-implemented method comprising:
   generating a moment for a first user of a social networking system based on information indicating an action performed by the first user, the moment indicating the action performed by the first user;
   determining a type of the moment based on a type of the action indicated by the moment, from among types of predetermined moments;
   determining that a predefined trigger has been satisfied based on the generated moment and the determined type of the moment;
   providing, in response to determining the trigger being satisfied, a request interface element indicating that additional content is capable of being requested for the moment of the first user, to one or more other users connected to the first user over the social networking system;
   providing, in response to the request interface element being selected by a second user of the one or more other users, request options to the second user, the request options enabling the second user to request that the first user provide additional contents to the social networking system, wherein the request options are determined based on the determined type of the moment;
   responsive to providing the request options, receiving, from the second user, a request that the first user provide additional content to the social networking system related to the action performed by the first user;
   providing, the request to the first user, wherein the provided request is presented, by a user device of the first user, to the first user by generating a modified image associated with the second user based on an icon representative of the request initiated by the second user and an image associated with the second user;
   responsive to providing the request, receiving, from the first user, the additional content corresponding to the request; and
   providing, to the second user, the additional content corresponding to the request,
   wherein the types of the predetermined moments comprise a travel type, a multimedia type, and a connection type, and
   wherein first types of first additional contents corresponding to the travel type are different from second types of second additional contents corresponding to the multimedia type or the connection type.

13. A non-transitory computer readable storage medium having computer program instructions, the computer program instruction to configure a process to perform operations comprising:
   generating a moment for a first user of a social networking system based on information indicating an action performed by the first user, the moment indicating the action performed by the first user;
   determining a type of the moment based on a type of the action indicated by the moment, from among a plurality of types of predetermined moments;
   determining that a predefined trigger has been satisfied based on the generated moment and the determined type of the moment;
   providing, in response to determining the trigger being satisfied, a request interface element indicating that additional content is capable of being requested for the moment of the first user, to one or more other users connected to the first user over the social networking system;
   providing, in response to the request interface element being selected by a second user of the one or more other users, request options to the second user, the request options enabling the second user to request that the first user provide additional contents to the social networking system, wherein the request options are determined based on the determined type of the moment;
   responsive to providing the request option, receiving, from the second user, a request that the first user provide additional content to the social networking system related to the action performed by the first user;
   providing, the request to the first user, wherein the provided request is presented, by a user device of the first user, to the first user by generating a modified image associated with the second user based on an icon representative of the request initiated by the second user and an image associated with the second user;

responsive to providing the request, receiving, from the first user, the additional content corresponding to the request; and providing, to the second user, the additional content corresponding to the request.

14. The computer readable storage medium of claim 13, wherein the instruction further configures the processor to perform operations comprising:

determining that the first user has been inactive for at least a threshold period of time; and providing, responsive to determining that the first user has been inactive for at least the threshold period of time, an additional request option to the other users, the additional request option enabling the other users to request content from the first user.

15. The computer readable storage medium of claim 14, wherein determining that the first user has been inactive for at least the threshold period of time comprises determining that a content item has not been received by the social networking system from the first user for at least the threshold period of time.

16. The computer readable storage medium of claim 13, wherein the moment is generated based on determining that the first user has traveled at least a threshold distance from a location indicated in a user profile of the first user and the generated moment indicates that the first user is traveling.

17. The computer readable storage medium of claim 13, wherein the additional content is at least two of: a digital image, a description of the action performed by the first user, and a current user location associated with the action performed by the first user.

18. The computer readable storage medium of claim 13, wherein an additional request for additional content related to the action performed by the first user is automatically presented to the first user responsive to determining that the trigger has been satisfied.

\* \* \* \* \*